C. W. GRAHAM.
MACHINE AND METHOD FOR CUTTING AND APPLYING GASKET LINERS.
APPLICATION FILED FEB. 8, 1918. RENEWED AUG. 12, 1922.

1,432,849.

Patented Oct. 24, 1922.
19 SHEETS—SHEET 1.

C. W. GRAHAM.
MACHINE AND METHOD FOR CUTTING AND APPLYING GASKET LINERS.
APPLICATION FILED FEB. 8, 1918. RENEWED AUG. 12, 1922.

1,432,849.

Patented Oct. 24, 1922.
19 SHEETS—SHEET 13.

WITNESSES:

INVENTOR
Charles W. Graham
BY
ATTORNEYS

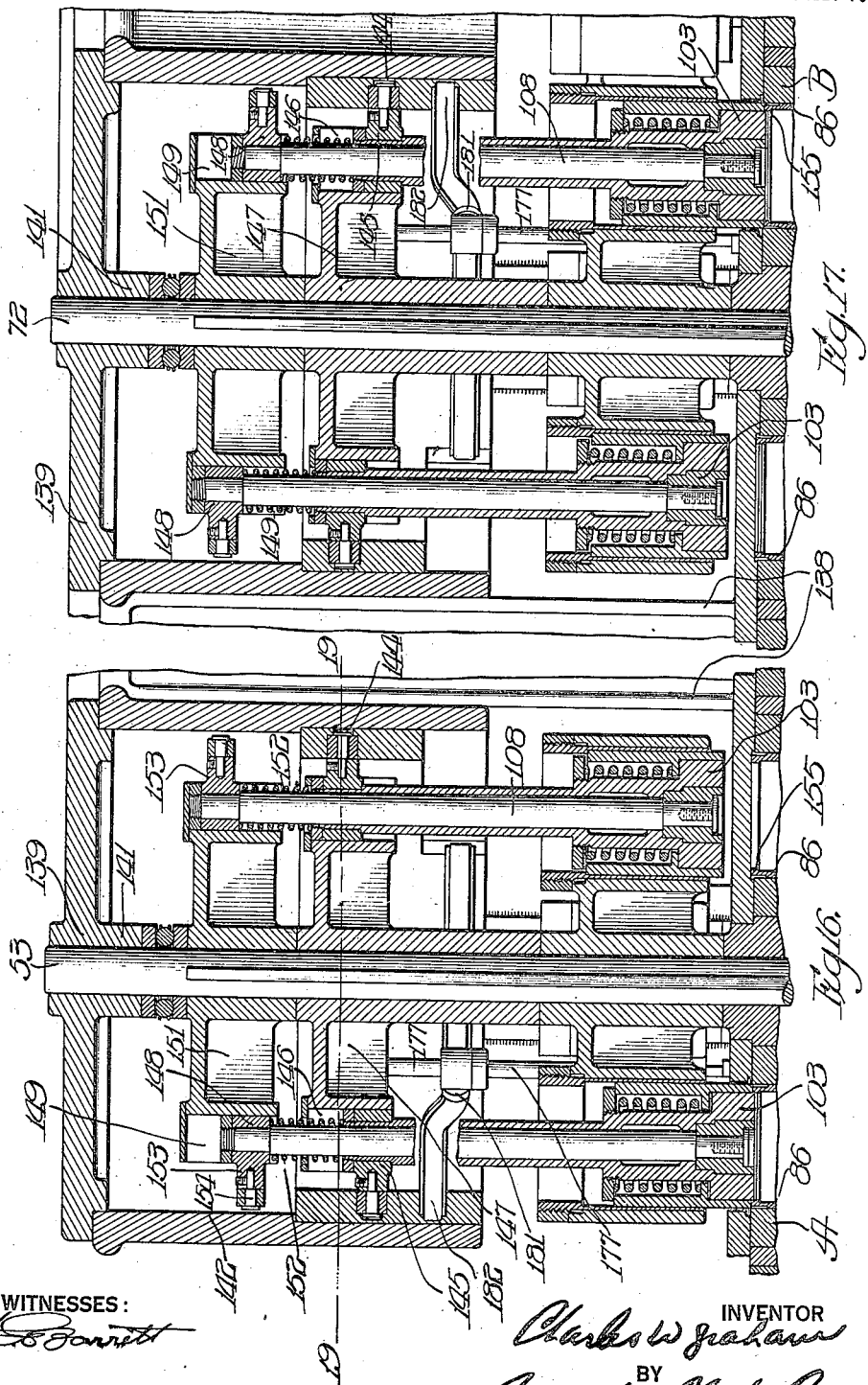

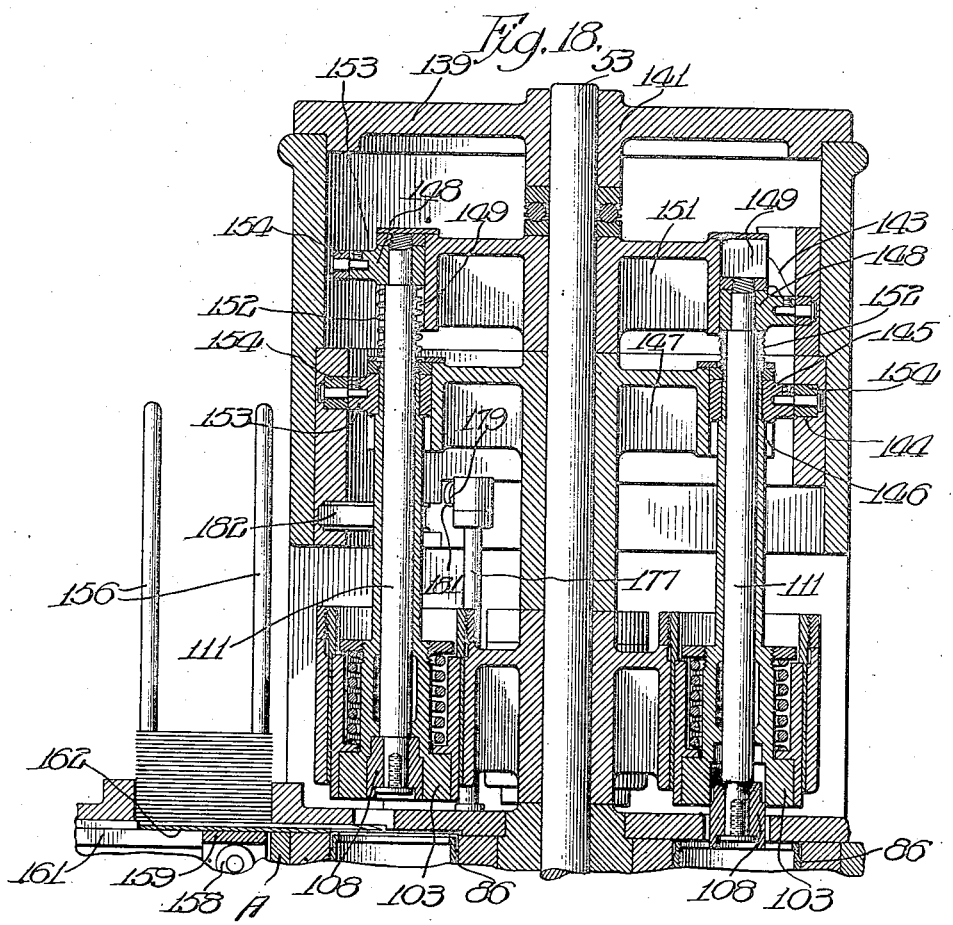

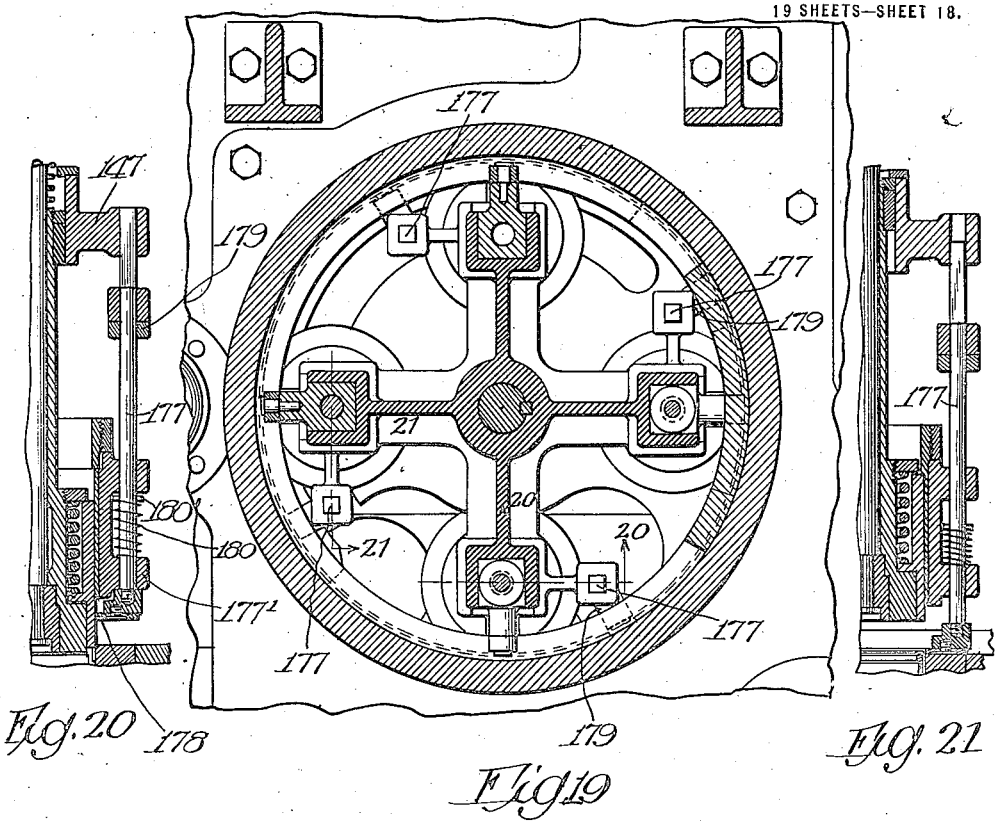

C. W. GRAHAM.
MACHINE AND METHOD FOR CUTTING AND APPLYING GASKET LINERS.
APPLICATION FILED FEB. 8, 1918. RENEWED AUG. 12, 1922.

1,432,849.

Patented Oct. 24, 1922.

Patented Oct. 24, 1922.

1,432,849

UNITED STATES PATENT OFFICE.

CHARLES W. GRAHAM, OF ALLENDALE, NEW JERSEY, ASSIGNOR TO AMERICAN CAN COMPANY, OF NEW YORK, N. Y., A CORPORATION OF NEW JERSEY.

MACHINE AND METHOD FOR CUTTING AND APPLYING GASKET LINERS.

Application filed February 8, 1918, Serial No. 215,954. Renewed August 12, 1922. Serial No. 581,495.

*To all whom it may concern:*

Be it known that I, CHARLES W. GRAHAM, a citizen of the United States, residing in Allendale, in the county of Bergen and State of New Jersey, have invented a new and useful Improvement in Machines and Methods for Cutting and Applying Gasket Liners, of which the following is a specification.

This invention relates in general to machines and methods for cutting and applying gasket liners to the flanges of can ends and has for its object broadly the provision of an automatic continuously operating machine of improved construction and rapid operation.

An important object of the invention is the provision of a machine which will cut the liners from a continuously traveling web or sheet of paper or other gasket lining material, thereafter maintaining mechanical control of the cut gaskets and applying such gaskets to the flanges of the shouldered can ends.

The invention contemplates among other novel features the provision of mechanism for cutting gaskets from a continuously moving web in such fashion and in such numbers that minimum waste of material results.

The invention has for another important object the provision of a machine for cutting and applying gasket liners, the parts of which are so constructed and arranged that it is unnecessary to repeatedly stop and start heavy masses of machinery with consequent expenditure of considerable power and energy so that in a machine embodying this invention the operation may be at relatively high speed and with smooth even operation.

A still further object of the invention is the provision of a machine of the character described consisting of relatively few parts and having high efficiency and unlikely to require frequent repair or replacement.

Numerous other objects and advantages of the invention will be apparent as it is better understood from the following description when considered in connection with the accompanying drawing illustrating a preferred embodiment thereof.

Figure 1:
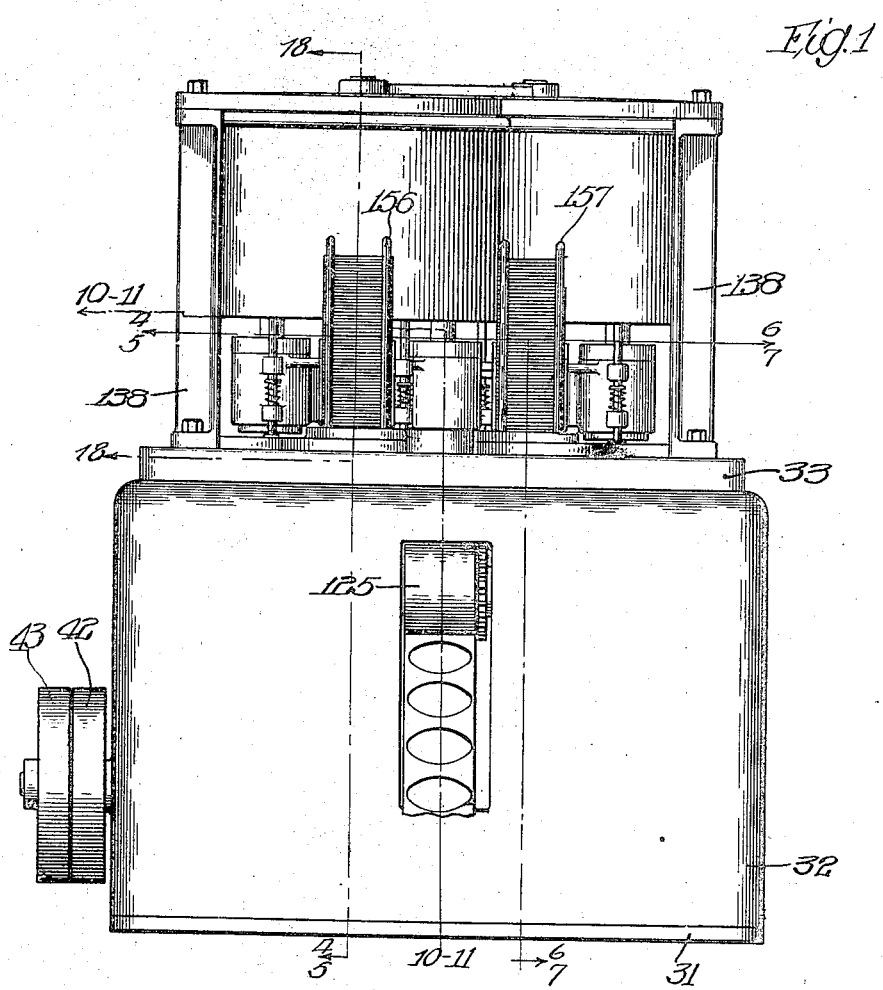
Figure 1 is a front view of a machine embodying my present invention.
Figure 2:
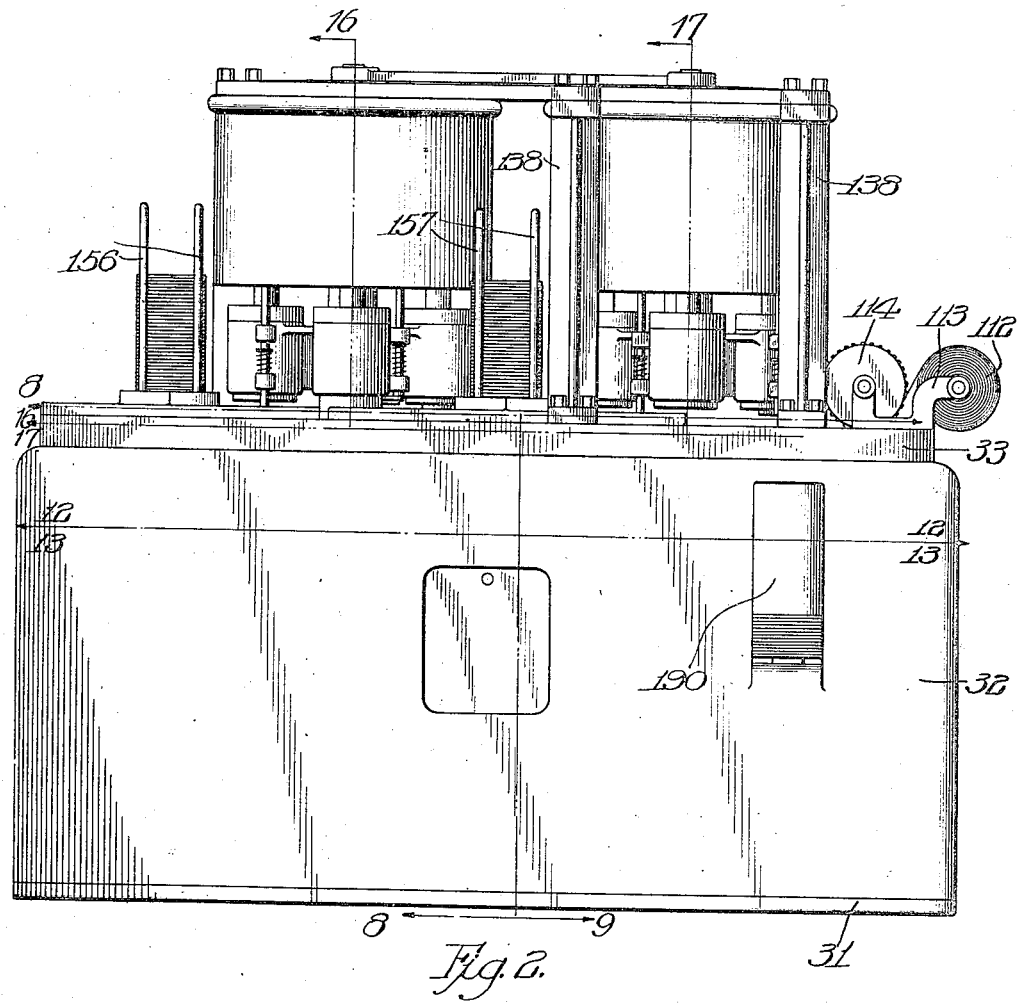
Fig. 2 is a side elevation of the same looking from the right in Fig. 1.
Figure 3:
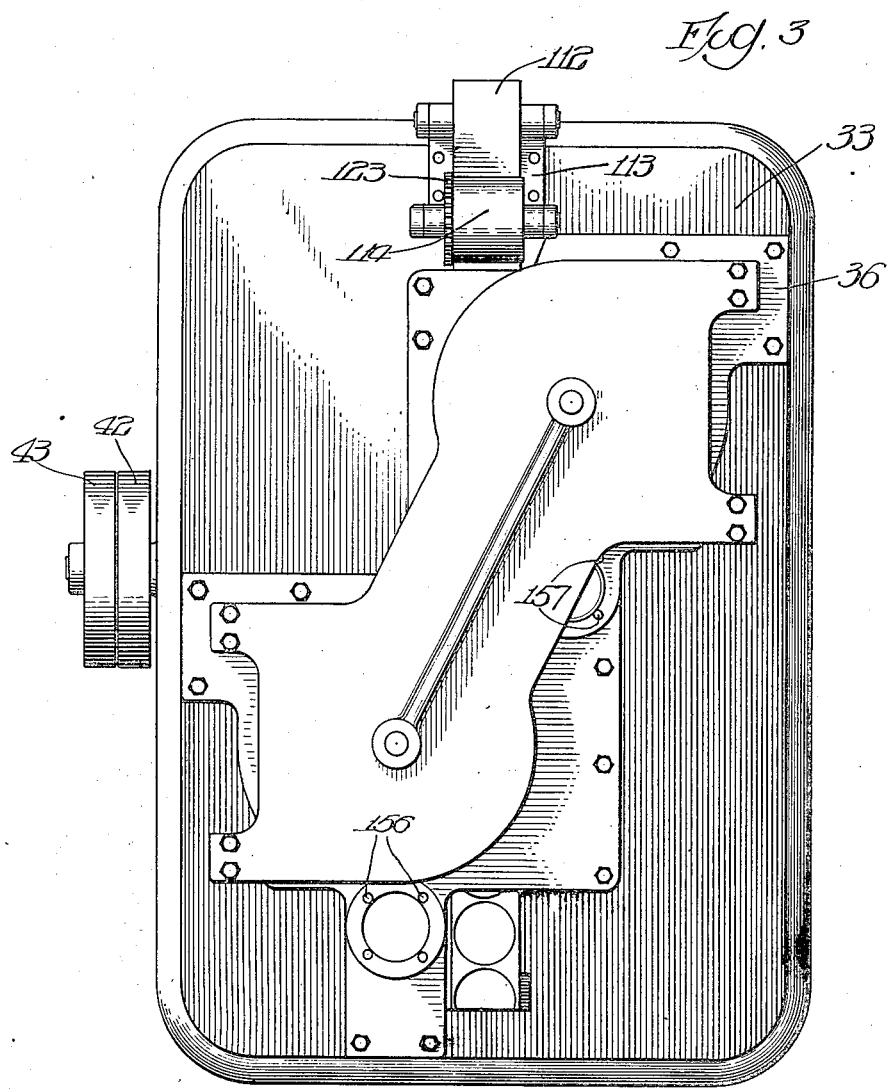
Fig. 3 is a top plan view of this machine.
Figure 4:
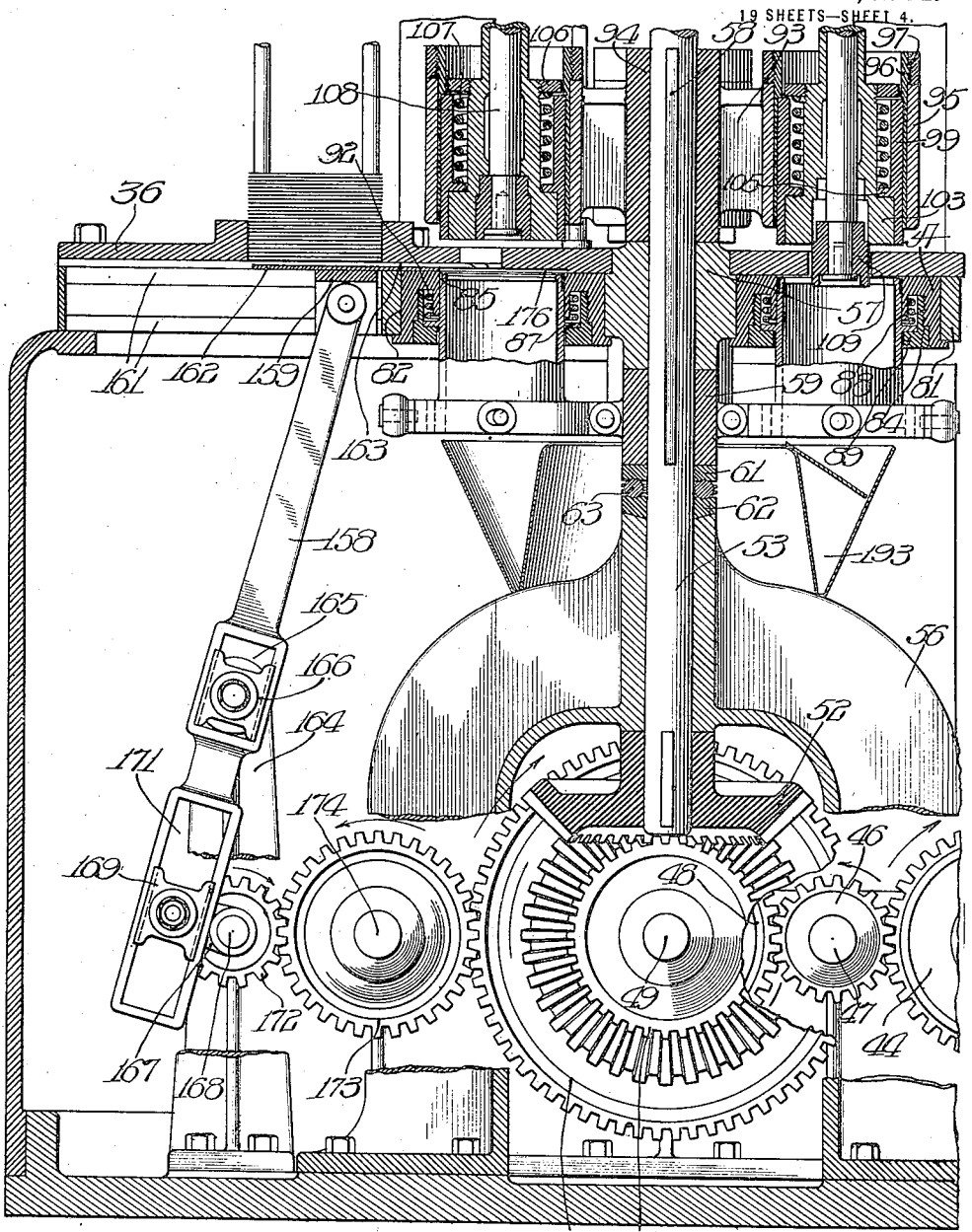
Figure 5:
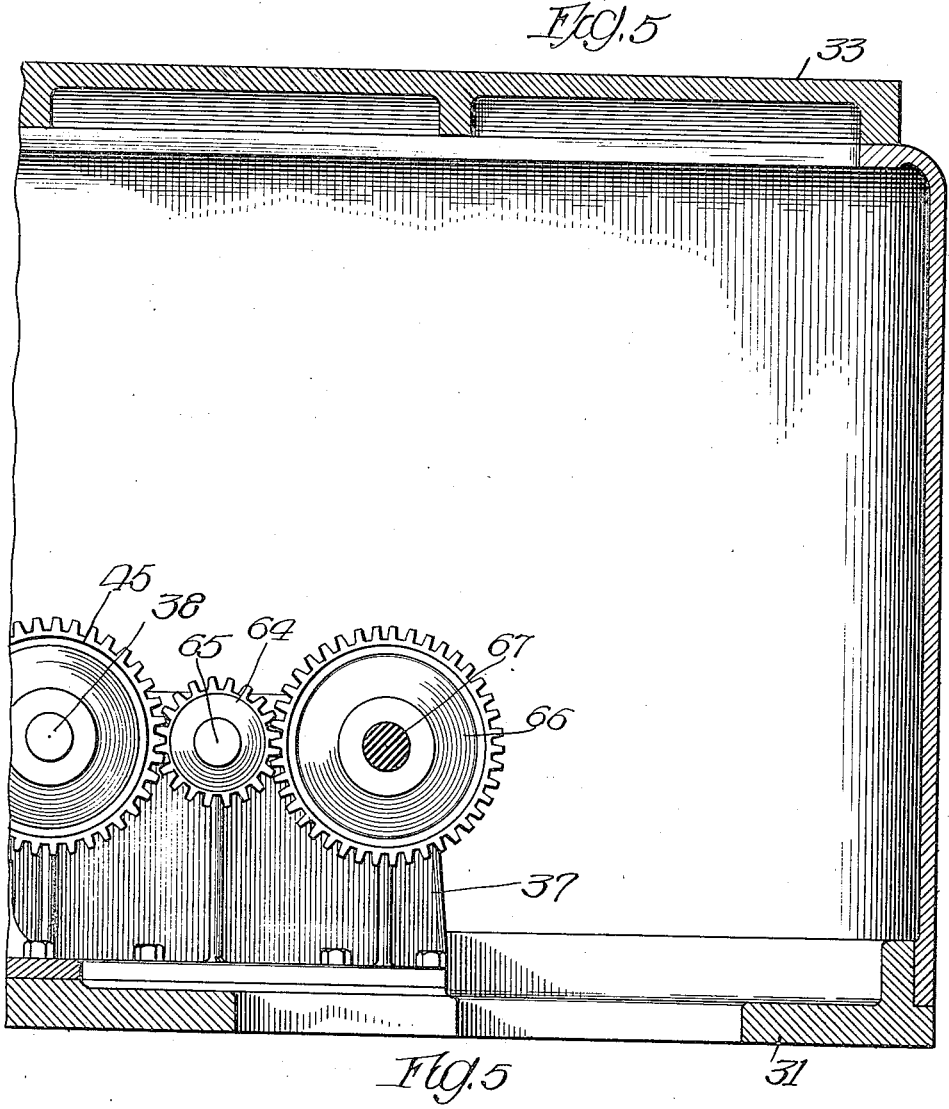
Figure 6:
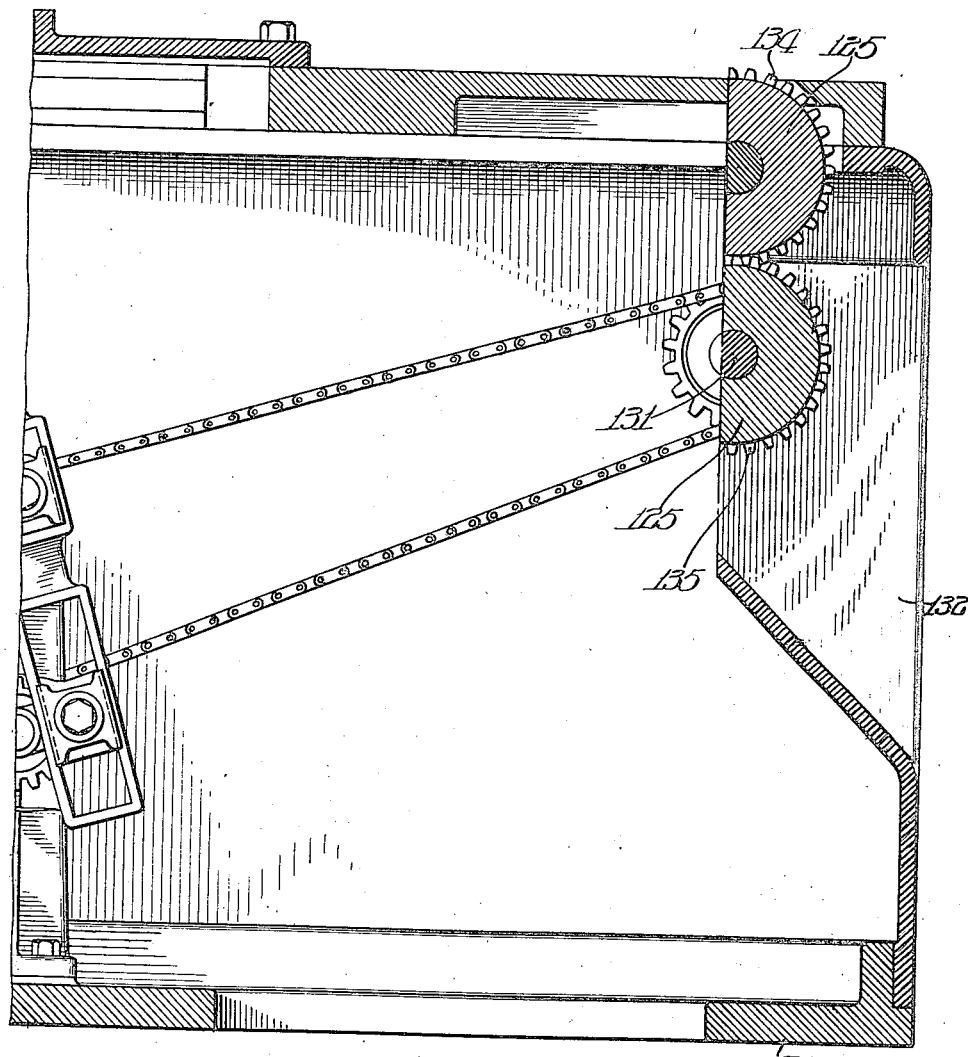
Figure 7:
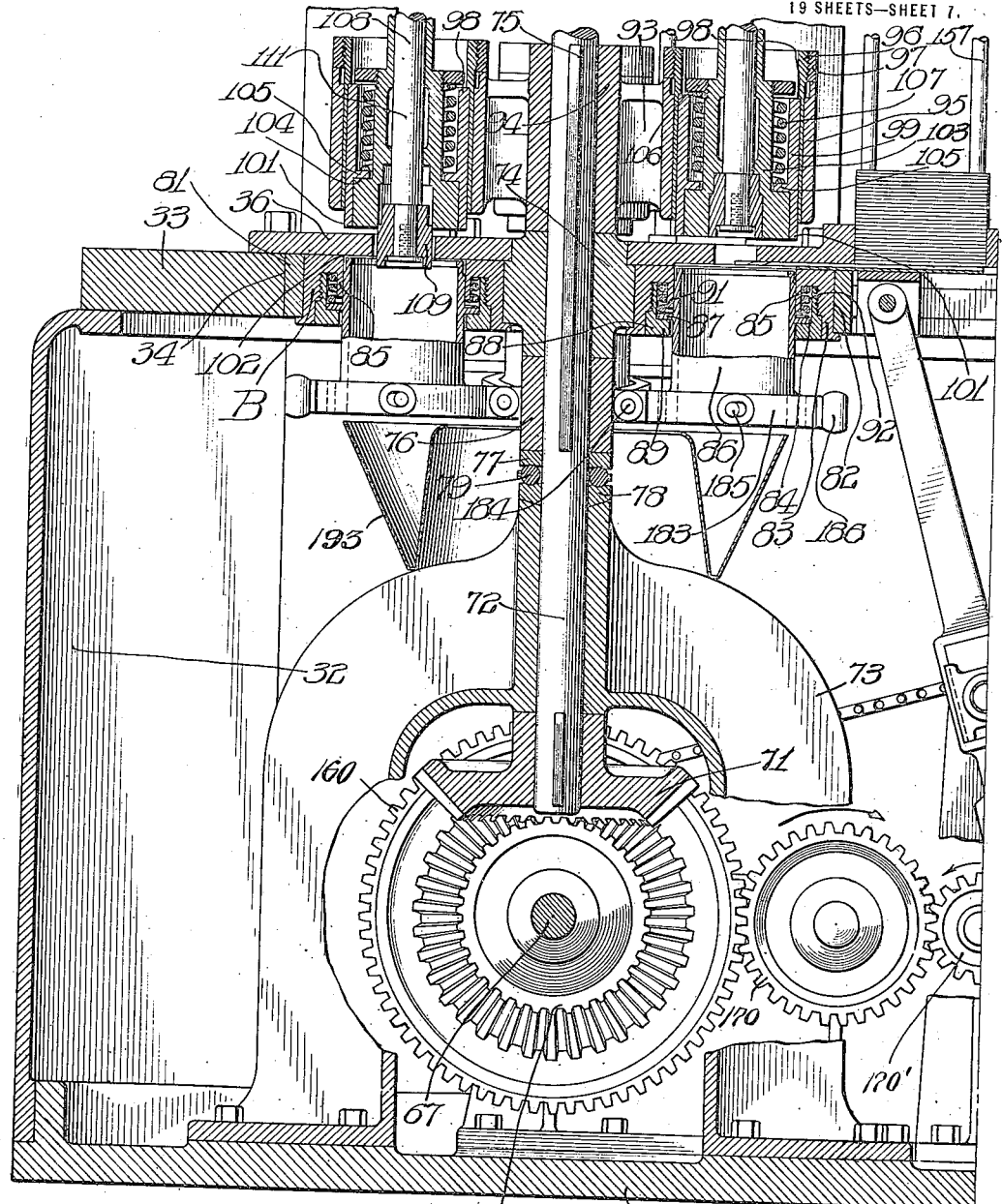
Figure 8:
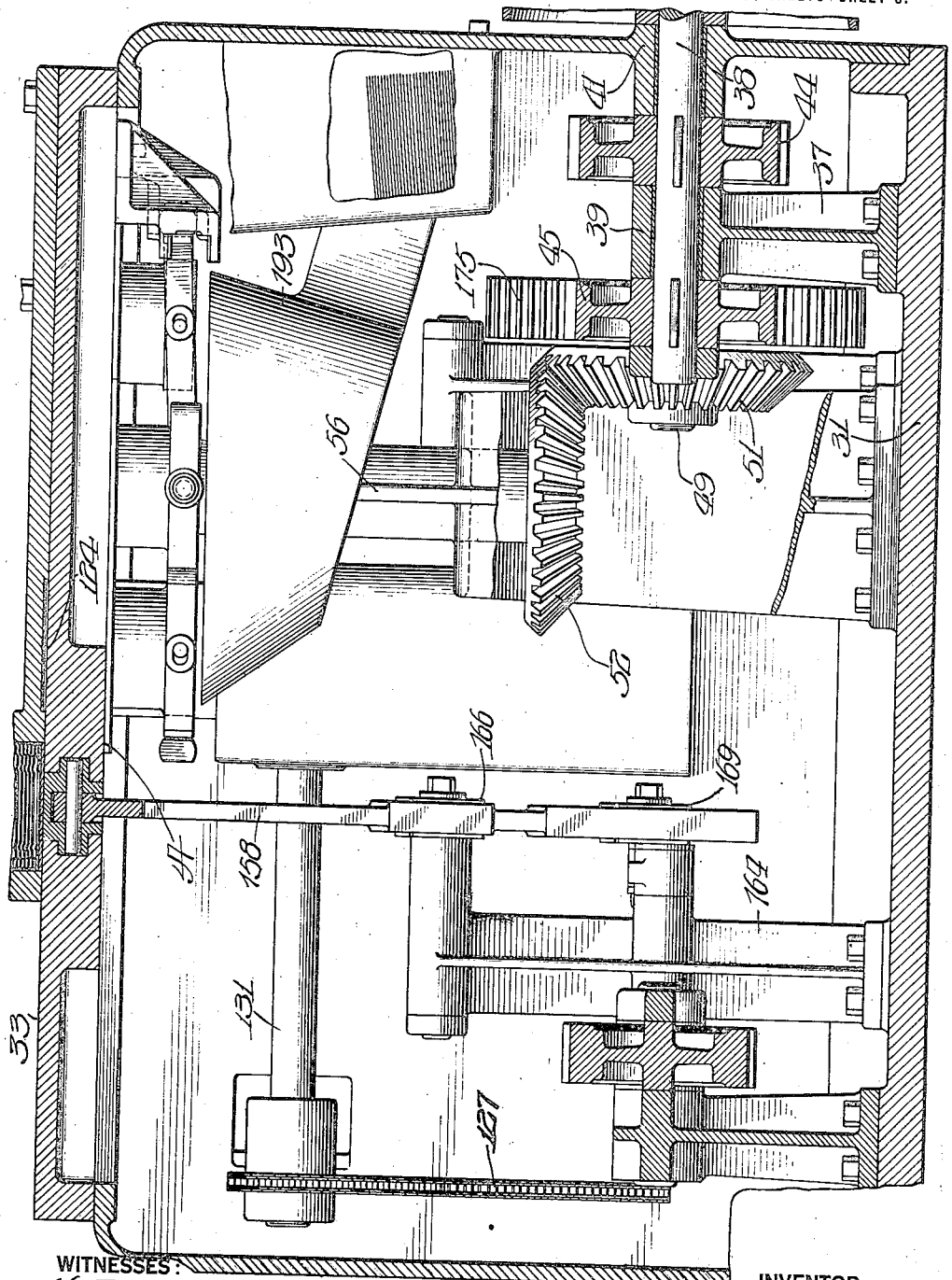
Figure 9:
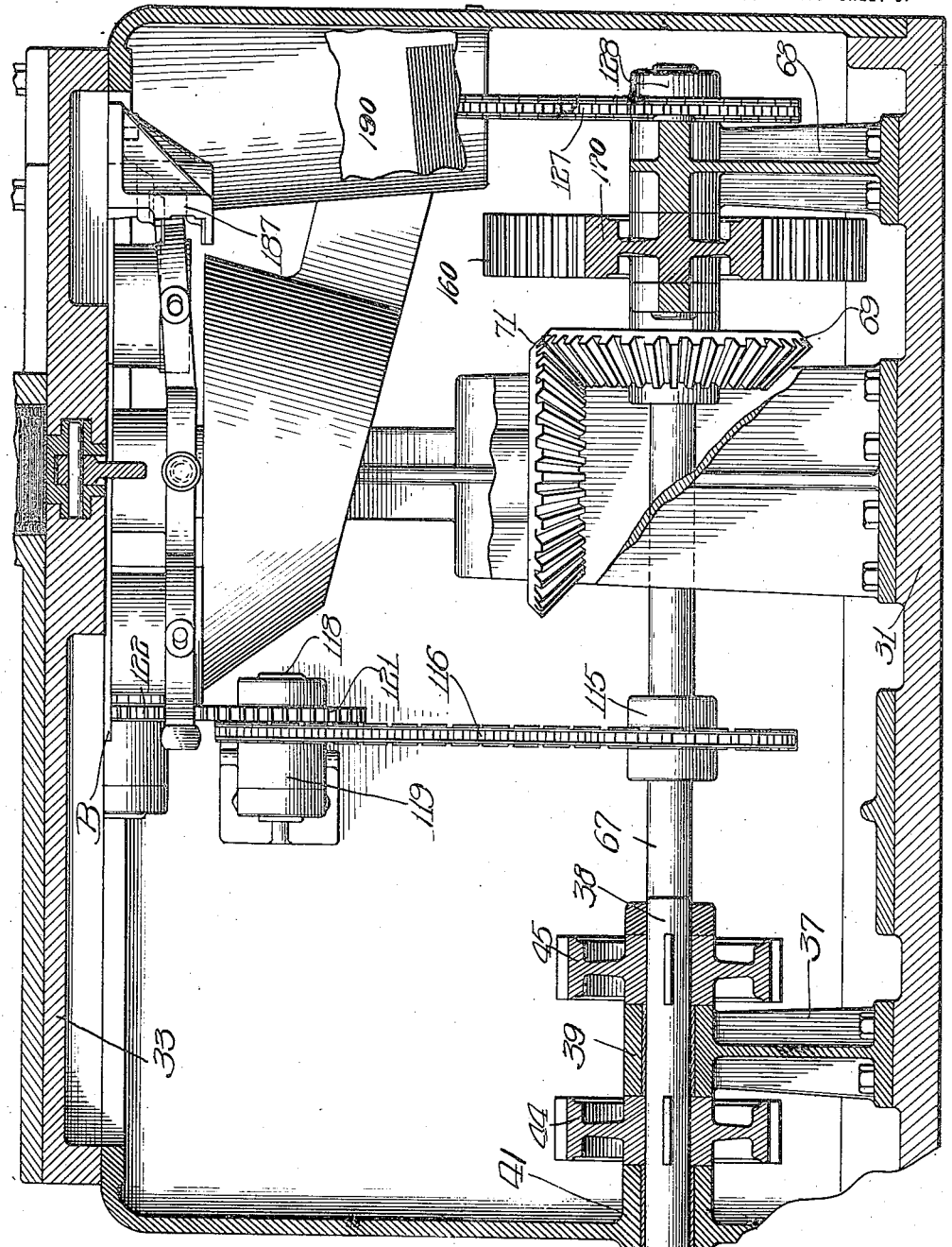
Figure 10:
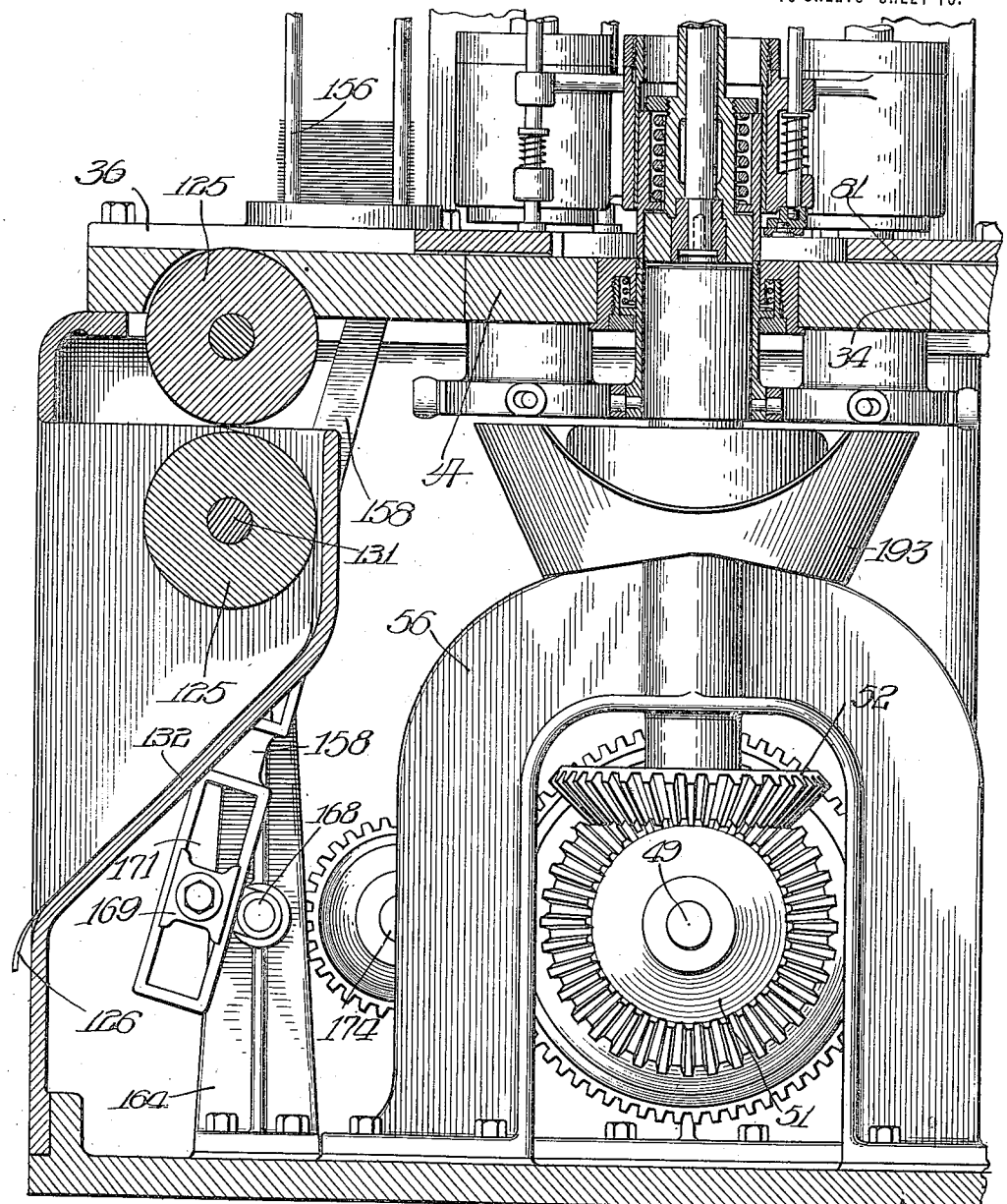
Figure 11:
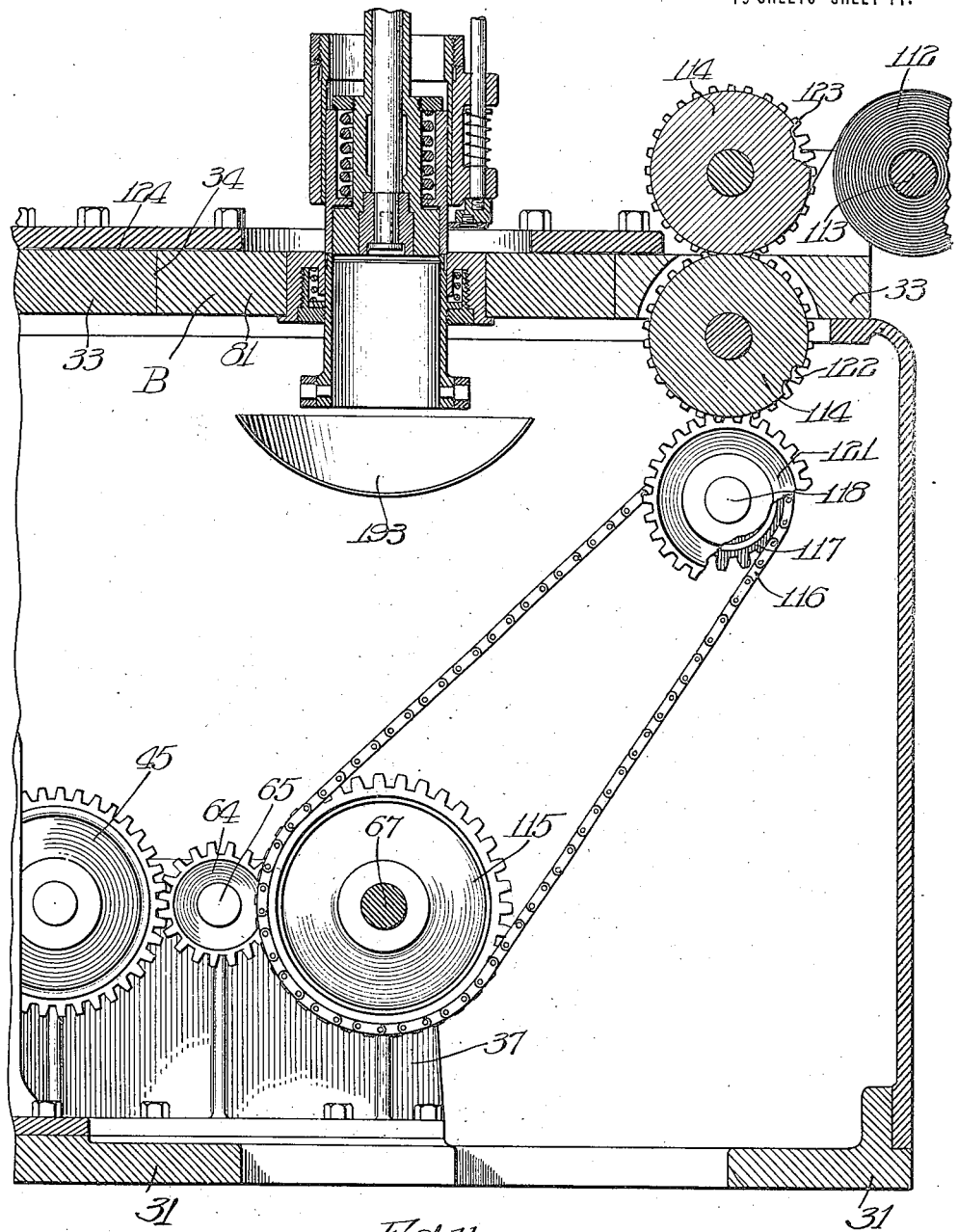
Figure 12:
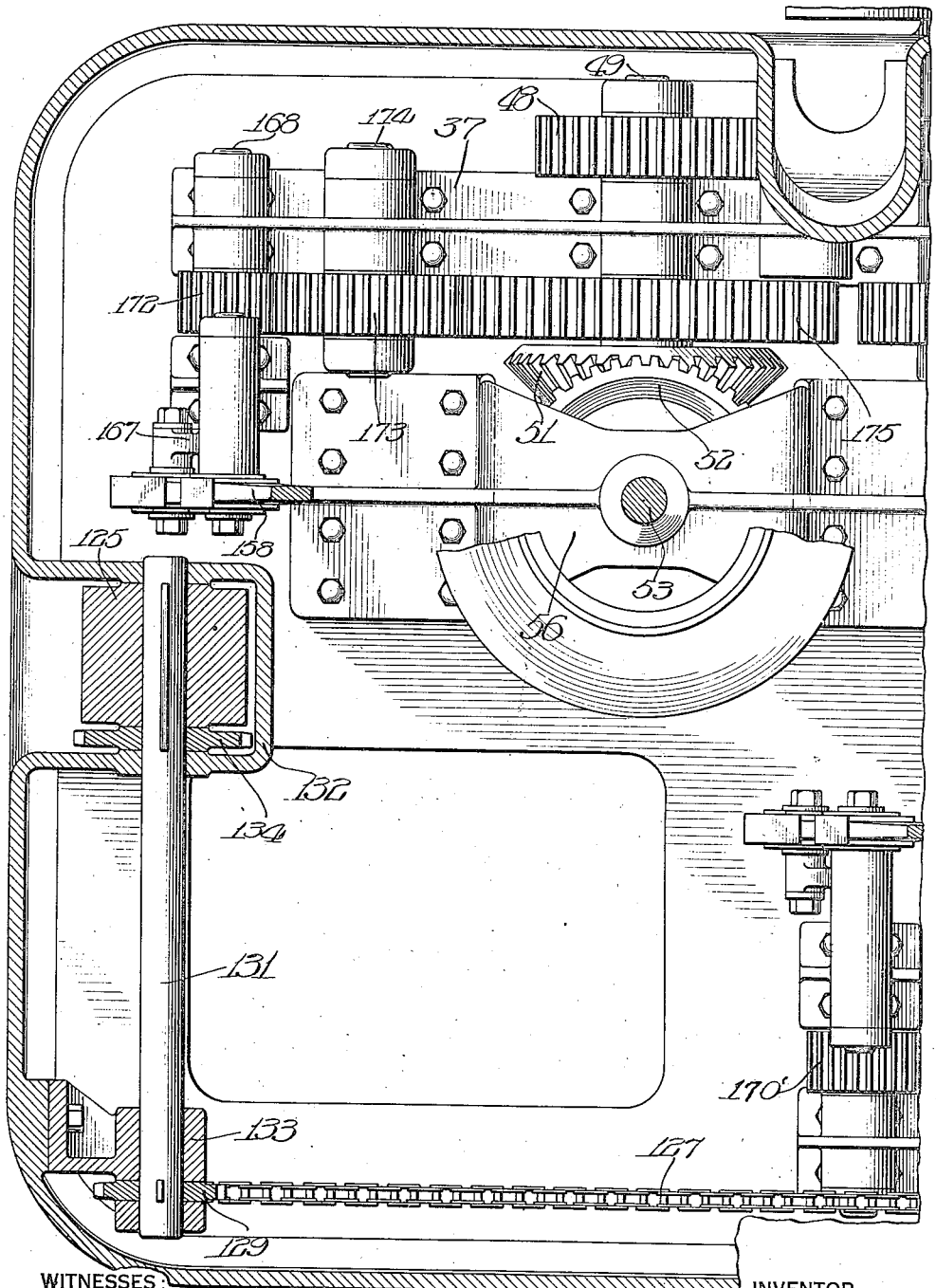
Figure 13:
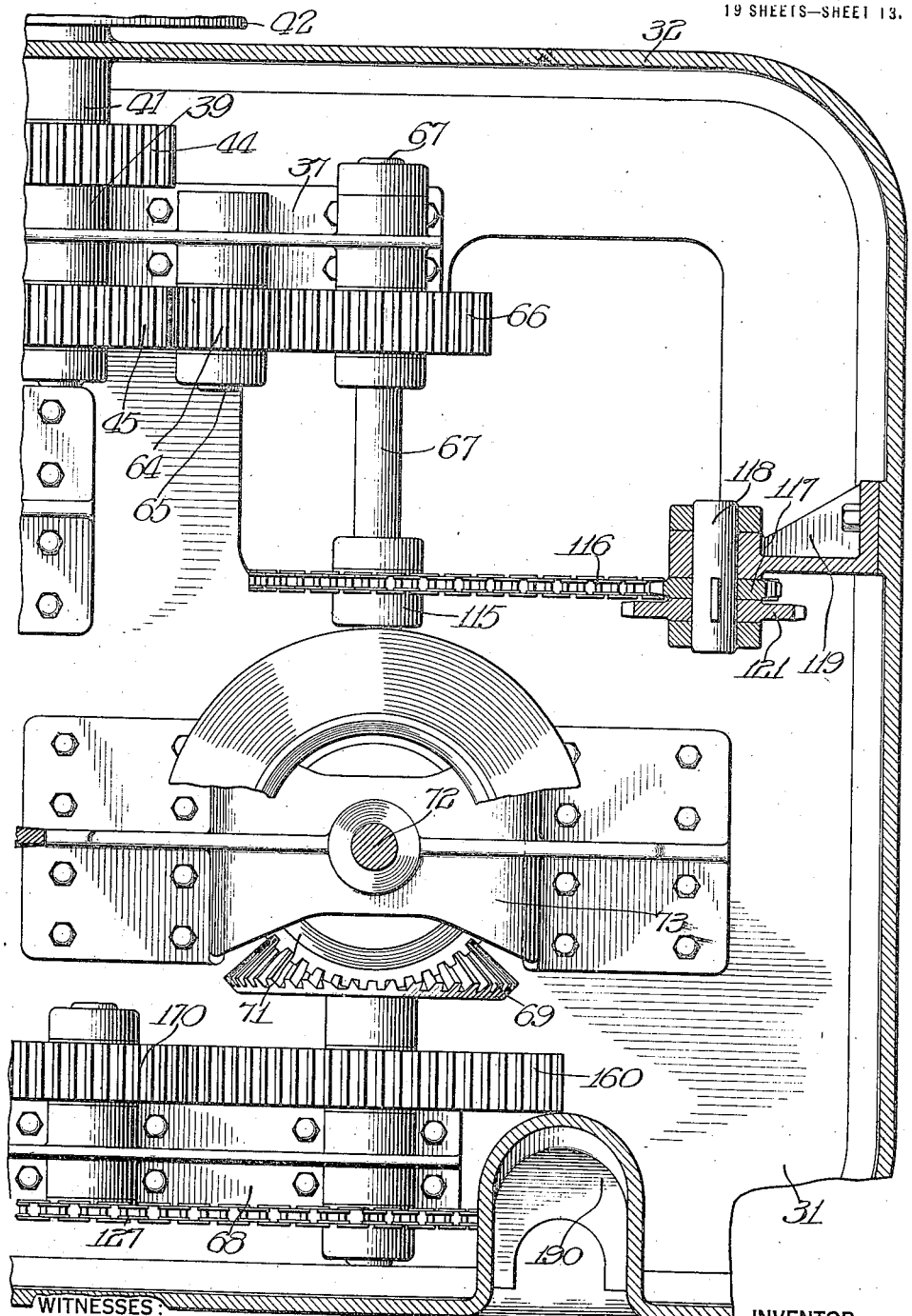
Figure 14:
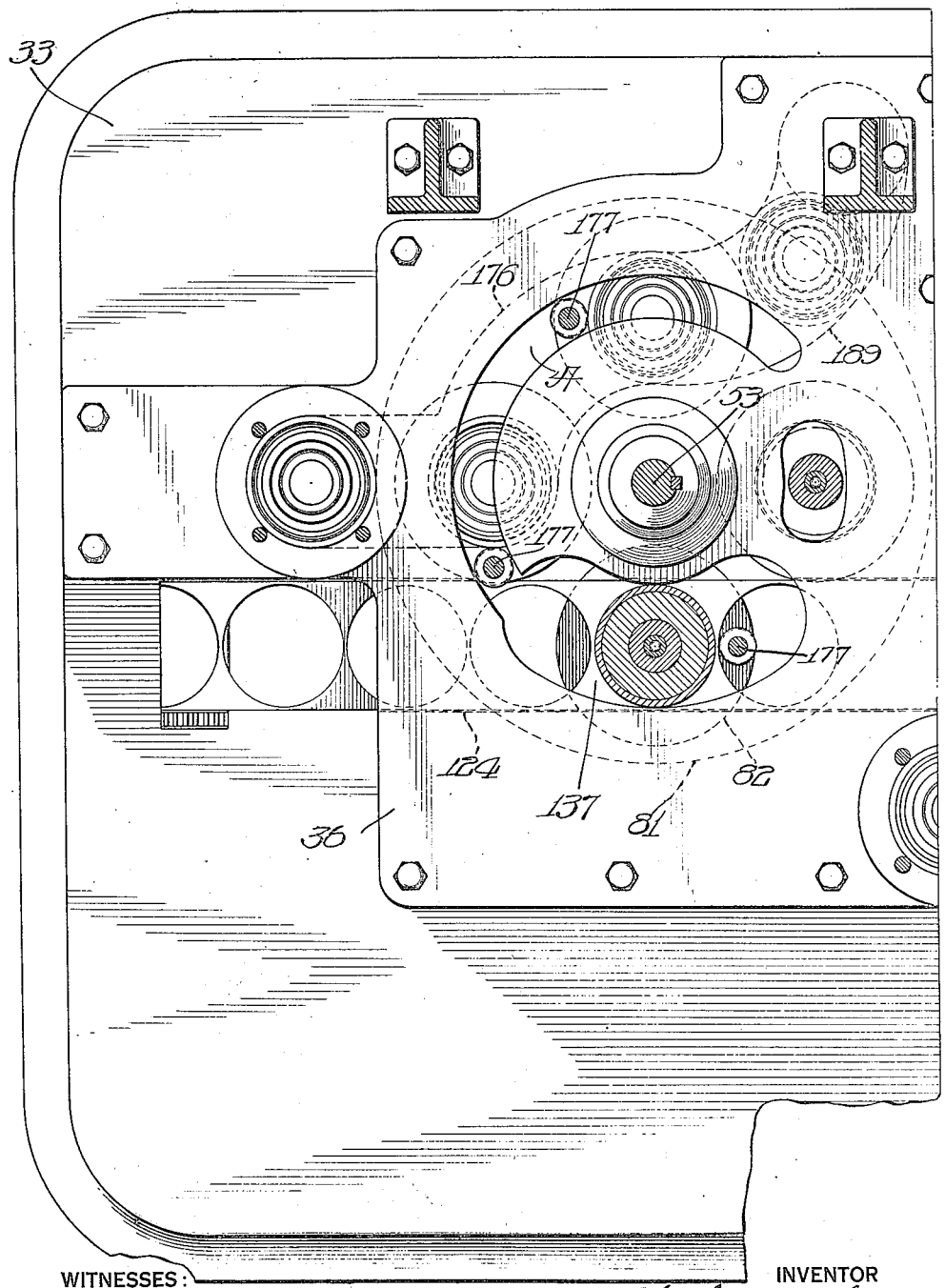
Figure 15:
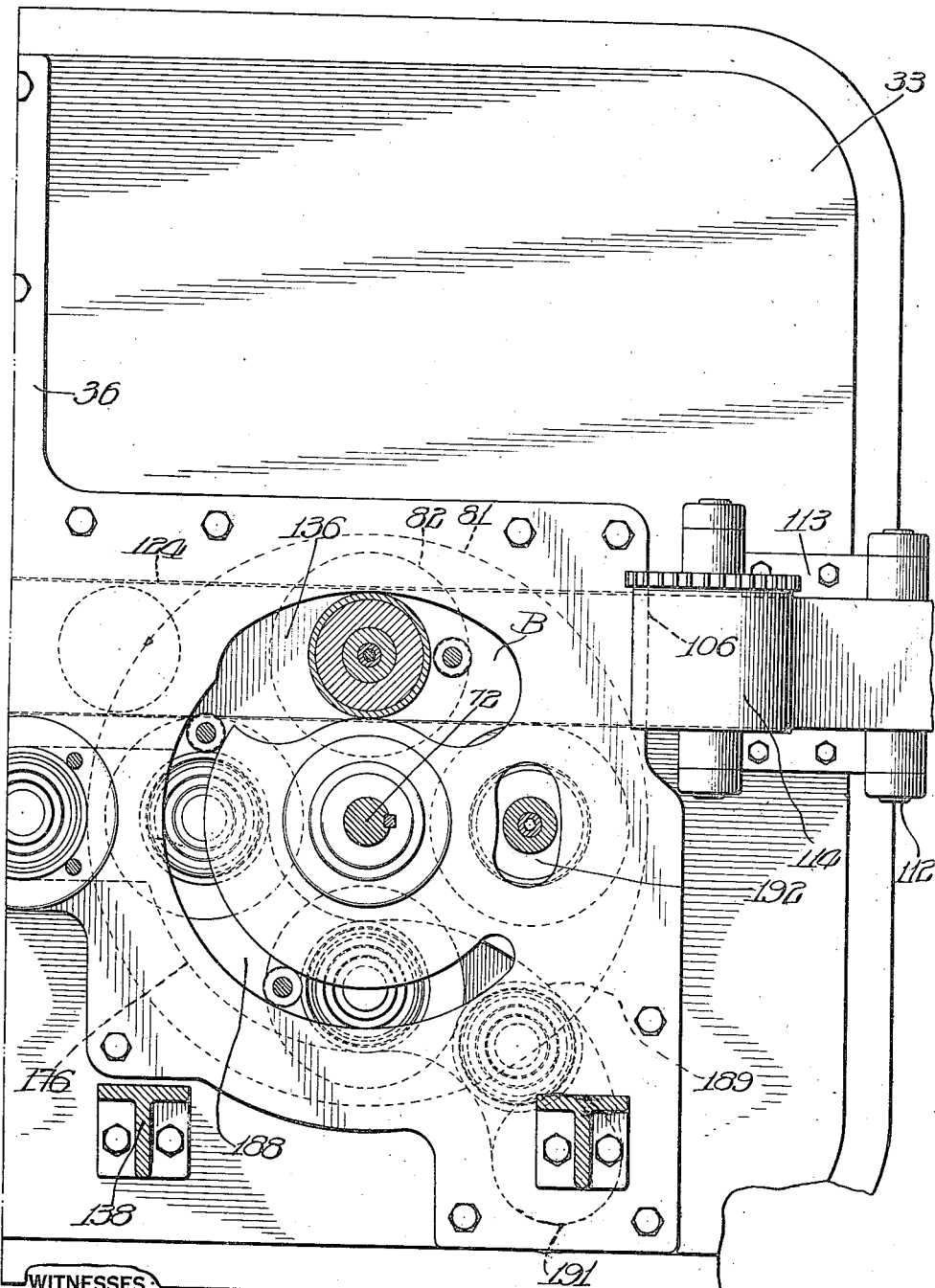

Figs. 4 and 5 are together a partial vertical sectional view taken substantially on the lines 4—4 and 5—5 of Fig. 1;

Figs. 6 and 7 are together partial vertical sectional view taken substantially on the line 6—6 and 7—7 of Fig. 1;

Fig. 8 is a partial vertical sectional view taken substantially on the line 8—8 of Fig. 2;

Fig. 9 is a similar section taken on the same line and looking in the opposite direction as indicated by the arrow 9 in Fig. 2;

Figs. 10 and 11 are together a partial vertical sectional view taken on the line 10—10 and 11—11 in Fig. 1;

Figs. 12 and 13 are together a horizontal sectional view taken substantially on the line 12—12 and 13—13 of Fig. 2;

Figs. 14 and 15 are together a horizontal sectional view of the base of the machine taken just above the cover plate of the turrets;

Fig. 16 is a vertical section through the upper portion of the machine taken substantially upon the line 16—16 of Fig. 2;

Fig. 17 is a similar view taken substantially on the line 17—17 of Fig. 2;

Fig. 18 is a similar section taken substantially on the line 18—18 of Fig. 1;

Fig. 19 is a horizontal section taken substantially upon the line 19—19 of Fig. 16;

Fig. 20 is a partial vertical sectional view taken on the line 20—20 of Fig. 19;

Fig. 21 is a similar view taken on the line 21—21 of Fig. 19;

Fig. 22 is a diagrammatic development of the knock-out punch cam;

Fig. 23 is a similar development of the gasket and center punch cam;

Fig. 24 is a similar development of a can end roller cam;

Fig. 25 is a similar development of the gasket placing cam; and

Figure 26:
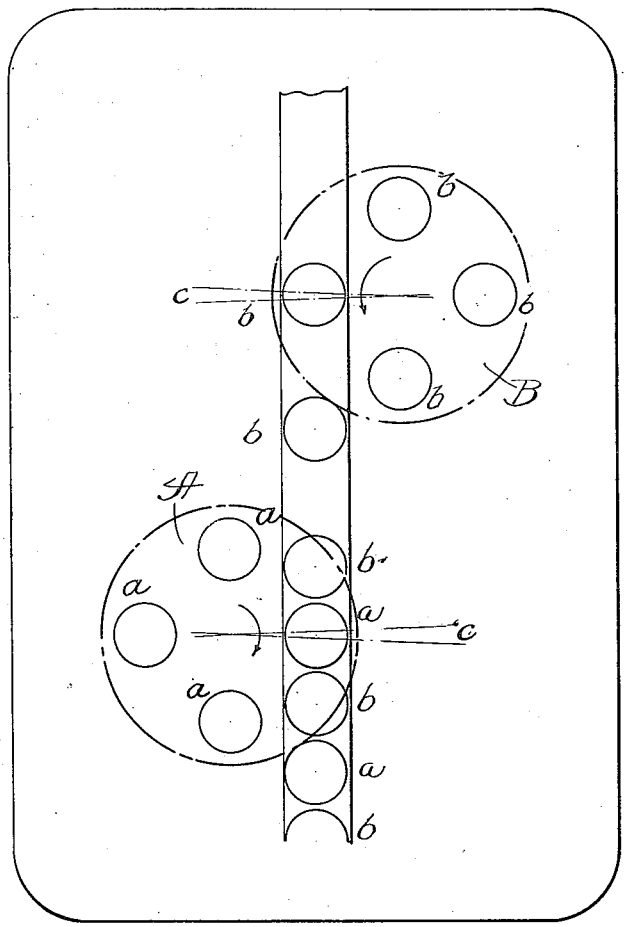

Fig. 26 is a diagrammatic plan view showing a movement of the strip or web of paper and the circular movements of the turrets with their operating parts.

The machine shown on the drawing is provided with two horizontal turrets each equipped with four operating stations continuously movable with the turret and adapted to cut a liner from the web of material, to carry the liner and core with the turret in its rotation, to receive a can end above the liner, to move the liner up into the can end, to eject the lined can end from the operating portion of the machine, and finally to eject the core.

The operating stations of each turret are located, of course, at an even distance from its center of rotation and the centers of these operating stations have a linear circular travel equal to the linear straight line travel of the strip of liner material which, as has already been stated, is fed continuously and without interruption through the machine. The cutting dies carried by the turrets travel continuously in circular paths while the material being operated upon is continuously traveling in a substantially straight line. The action of the dies in cutting is made rapid and almost instantaneous, the cutting occurring during the travel of the turret through an arc of approximately 4° only, this arc being determined by the ratio of the linear speed of the paper and dies to the speed of action of the dies and also by the diameter of the turret. Of course, theoretically the paths of the dies and of the paper cannot be made coincident since one is traveling in a circular line and the other in a straight line but the parts may be so constructed and timed that the cutting of the accurate gaskets is accomplished.

The dies are so arranged in the turrets that they make alternate cuts on the strip or web of gasket material, the dies of the second turret cutting between the cuts made by the dies of the first, th s in order that the cuttings may be made close together and waste minimized.

Previously formed can ends are fed to the continuously rotating turrets from stacks by suitable feed mechanism and are axially aligned with the cut gaskets and assembled therewith. The gaskets after being cut are mechanically held as they are received from the strip and until they are placed in the can ends. In the present instance this is accomplished by retaining the gaskets within one of the cutting elements. This feature minimizes the possibility of damaging the gasket from the time it is cut until it is placed in the can end.

Referring to the drawings in detail reference character 31 indicates a base upon which the machine is mounted. Upon this base is provided a main housing 32 which encloses the driving parts of the machine. A bed 33 is mounted upon the housing 32 in any preferred fashion and in this bed are two openings or circular apertures 34 in which two rotating turrets, generally indicated at A and B, are provided. Above the turrets is mounted a cover plate 36.

Mounted upon the base 31 is an upwardly extending bracket 37 (Fig. 8) which forms a bearing 39 for a main power shaft 38; this shaft extending through a bearing 41 in the casing and carries at its outer end fast and loose pulleys 42 and 43. This shaft provides power for rotating both turrets, actuating the feeding devices and all other moving parts of the machine. Two gears 44 and 45 are fast on the shaft 38 and each of these gears actuates a train of gears. The train of gears actuated by the gear 44 is associated with the turret A and its attendant mechanisms and the train actuated by the gear 45 is associated with the turret B and its attendant mechanisms.

The train of gears actuated by the gear 44 comprises an idle pinion 46 (Fig. 4) upon a shaft 47 carried in the bearing member 37. The pinion 46 meshes with a driving gear 48 upon a shaft 49 also having bearings in the bearing member 37. The shaft 49 carries a bevel or mitre gear 51 upon its end. The bevel gear 51 meshes with a companion gear 52 fast on the end of a vertical shaft 53 and having bearing in a yoke 56 extending up from the base plate 31. The shaft 53 extends through the hub 57 of the turret A and a key 58 is provided to insure rotation of the turret with the shaft 53. The shaft and turret rest upon the yoke 56 and a collar 59 located beneath the turret carries at its bottom a member 61 of an anti-friction raceway, the companion member 62 of which is mounted upon the top of the yoke, bearing balls 63 being provided in the race-way.

The gear 45 actuates a pinion 64 (Figs. 5, 11 and 13) mounted upon a stub shaft 65 also carried by the bearing member 37. This pinion by an idler gear 60 actuates a gear 66 upon a shaft 67 extending substantially across the interior of the casing 32, having bearing at one end in bearing member 37 and at the other in a bearing member 68 (Fig. 9) extending up from the base 31. The shaft 67 is provided with a bevel or mitre gear 69 which meshes with a companion gear 71 upon the lower end of a vertical shaft 72 having bearing in and supported by a yoke 73. The shaft 72 extends through the hub 74 of the turret B and is keyed to it by an elongated key 75. The shaft 72 is provided with a collar 76 which carries at its lower end the upper member 77 of an anti-friction race-way, the lower portion 78 of which is mounted upon the yoke 73 forming a bearing for shaft 72, ball bearings 79 being provided in the race-way.

Each turret consists of a circular plate 81 mounted in a circular aperture in the bed 33 and the turret is provided with four equally spaced openings 82 in each of which is seated a composite cutting die. The dies are of identical construction in both turrets and the description of a single set will be sufficient, it is believed. Each die consists of an outer casing 83 (Fig. 7) suitably fitted and secured in the aperture and provided with a recess 84 in its under side and also having a straight wall perforation 85 extending through it. A vertically movable cutting sleeve 86 is fitted in the opening 85 and is provided with an outwardly extending flange 87 entering part way into the recess 84. A stop ring 88 is threaded into the recess 84 of the die case and has a shoulder 89 disposed beneath the flange 87 of the movable die member. A flange or lip 91 on the case extends down to a distance above the shoulder 89 to form an upper stop, the die member 86 being movable from engagement with the shoulder 89 up into engagement with the stop formed by this lip. A spring 92 is provided between the base of the recess 84 and the flange 87 to normally hold the die member in lowered position.

A composite punch is carried by the turret above each composite die. These punches are mounted in a punch spider 93 having a hub 94 secured on the shaft 72 or 53 as the case may be, which spider is mounted above the cover plate 36. The hub of the turret extends through the cover plate and the punch spider bears upon the upper face of the hub. Suitable recesses are provided in the cover plate as will be later described to permit co-operation of the punches with the dies.

The eight punches provided, four for each turret, are of substantially identical construction and a description of one of them is therefore thought to be sufficient. Each spider arm is provided with a barrel or hollow cylinder 95 at its outer end, the center of which is in alignment with the center of the composite die. A sleeve 96 fits within the cylinder 95 and has a threaded collar 97 engaging the upper end of the cylinder providing thereby for adjustment of the sleeve vertically. The sleeve 96 has an internal shoulder 98 forming a stop for the upward movement of the outer active die member 99 which is of hollow cylindrical form fitting nicely within the sleeve. This die member has a cutting edge 101 which co-operates with a cutting edge 102 formed at the inner circumference of the top of the die case 83, and these edges cut the outside circumference of the gasket. A second active punch member 103 co-operates with the movable cutting die or sleeve 86 to cut the core. The cutting member 103 fits at its bottom neatly within the hollow cylindrical punch 99 and is reduced in diameter above its end to provide a shoulder 104 adapted to be engaged by an inwardly extending flange 105 of the outer punch 99. The core punch 103 is provided with an upwardly extending hollow stem adapted to be actuated by suitable mechanism, to be later described, to move the die members down in the cutting operation. A collar 106 is threaded on this stem in position to engage the upper end of the outer punch member and a spring 107 is interposed between this collar and the flange 105. Within the core punch is mounted a core knock-out 108 consisting of a head 109 retractable into the core punch and projectable therefrom and mounted upon the end of a stem 111 which is adapted for separate operation by the punch actuating mechanisms to be presently described.

Gasket material or paper is fed from a roll 112 (Fig. 11) carried on a roll holder 113 at the right of the machine (viewing Fig. 2). From this roll the end extends first through a pair of feeding rolls 114 mounted so that the contact of their feeding surfaces is located at the surface of the bed. These rolls are driven, as will be seen by viewing Fig. 11, from the shaft 67 by a sprocket wheel 115 mounted on such shaft. A sprocket chain 116 engages the sprocket wheel 115 and also a sprocket pinion 117 upon a shaft 118 carried in a bearing 119 (Fig. 13) from the casing wall. The shaft 118 carries a pinion 121 meshing with a pinion or gear 122 upon the lower roll 114, said gear 122 meshing also with the gear 123 upon the upper roll so that both rolls are positively driven. From the rolls 114 the paper passes through a slot 124 provided between the cover plate 36 and the bed 33, being provided in the present instance by suitably recessing the cover plate 36. This slot directs the paper strip above each turret as indicated diagrammatically in Fig. 26 and during its passage the gaskets are cut from it. The waste end is received between two rollers 125 (Fig. 10) and located at the opposite end of the machine, the uppermost roller, however, being mounted beneath the bed and the paper passing first over this roller and then down between the two and then out of the machine as indicated at 126 in Fig. 10.

The rolls 125 are also positively driven from the shaft 67 by a sprocket chain 127 (Fig. 12) taking over a sprocket wheel 128 (Fig. 9) on the end of the shaft 67 and over a sprocket wheel 129 upon a shaft 131 upon which the lowermost feed roll 125 is secured, this shaft having bearings in an inwardly extending part 132 of the casing and also in a bracket 133 extending inwardly therefrom. The rolls 125 carry companion intermeshing gears 134 and 135 (Fig. 6) which cause these rolls to move together.

As the paper is fed forward the turret B first cuts gaskets from it leaving openings as indicated at $b$—$b$ in Fig. 26, and as the strip is fed past the turret A gaskets are cut leaving openings as indicated at $a$—$a$ and between the openings $b$—$b$.

This cutting is accomplished by the co-operation of the composite dies and punches during the movement of the parts, the dies being located beneath the top surface of the bed and beneath the travel of the paper and the punches above the bed and the travel of the paper and above also the cover plate 34.

This cover plate is best shown in Figs. 14 and 15 from which it will be noted that the cover plate is provided with two enlarged openings 136 and 137 to permit movement of the punches down on their operative stroke.

The punches are caused to operate at the proper instant by two cam drums, one provided in connection with each turret and supported by upwardly extending brackets 138 to which they are secured. A cover 139, which provides bearing 141 for the upper ends of the shafts 53 and 72, is provided and fits down upon the tops 142 of the cam drums. The cam drums are shown best, it is thought, in Figs. 16 to 19. Each drum is provided with a cam slot 143 for actuating the core knock-out punch and with a cam slot 144 for actuating both the cutting punches. The core punch 103 is, as has been stated, provided with an upwardly extending hollow stem which engages at its upper end in a block 145 vertically movable in a recess 146 provided in an arm of a spider 147 mounted upon and rotatable with the turret shaft.

The rod which forms the stem 111 of the core knockout 108 extends on up through and above the hollow stem of the core punch and is provided with a block 148 at its upper end, which is movable in a recess 149 in an arm of a spider 151, also fast upon the shaft and above the spider 147. A spring 152 is provided to hold the knock-out punch in elevated position. Each block 145 and 148 is provided with an outwardly extending projection 153 in the end of which is mounted a roller 154 for engaging in the appropriate cam groove.

As a composite die and its companion punch arrive at the cutting station, the roller 154 of the punch in the cam groove 144, which is continuous about the inside of the drum, is depressed and the outer punch and die edges cut a disk of diameter equal to the external diameter of the gasket or liner, bringing the disk thus cut down upon the upper edge of the movable sleeve or die 86 at which time the downward movement of the outer punch member is stopped by pressing upon the upper end of the movable die member 86 and the core punch continues on down cutting the core and leaving it just below the level of the gasket and within the die 86. It will be noted that each die 86 is provided at its top with an inwardly projecting part 155 (Fig. 17) and the core is held in this portion until it is ejected after the gasket is assembled in the cam end. The punches are then carried back up by the movement of the cam as will be apparent upon viewing Fig. 23 and the turret rotates with the liner formed in it to the cam end receiving station which is located 90° in advance.

Cam ends are fed above the liners and in inverted position from stack holders 156 and 157 located respectively adjacent the turrets A and B. The mechanism for feeding the can ends into assembling relation with the turret A comprises a lever 158 (best shown in Fig. 4). This lever is pivoted at its upper end to a slide block 159 movable in ways 161 and secured beneath a can end push plate 162 carrying upon its upper face can end separating fingers 163. The lever has a sliding fulcrum upon the upper end of a bracket arm 164, being slotted at 165 and engaging a slide block 166 upon the fixed extension or arm 164 (Fig. 8). Oscillation is given the lever by a crank arm 167 carried upon the end of a shaft 168 and having a slide block 169 movable in a slot 171 in the ends of the lever. The shaft 168 is provided with a pinion 172 meshing with the gear 173 upon a stub shaft 174 in the bearing 37. The gear 173 is in mesh with a gear 175 upon shaft 49. As the lever is oscillated, which occurs four times for each revolution of the turret, the fingers 163 first lift the weight of the stack of can ends off the lowermost can end and permit the slide 162 to push it forward into a slot 176 provided between the bed and the cover plate 34 and above the turret.

The mechanism for feeding the can ends into the turret B is substantially a duplicate of the mechanisms just described and used for feeding the can ends into the turret A, and it is believed particular description of it is therefore not necessary. It might be mentioned, however, that this mechanism is appropriately located and is actuated from the gear 160 (Figs. 7 and 10) upon the shaft 67 through idler 170 to a pinion 170' (see Fig. 12), said idler and gear being constructed and arranged like the idler 173 and pinion 172.

Means are provided for causing the can end to move with the turret for a part of its revolution. This means comprises a rod 177 located just rearwardly of each set of composite punches and is best shown in Figs. 20 and 21. This rod has bearings in the spiders 93 and 147 and carriers at its lower end an offset roller 178. The rods 177 are normally held in elevated position by a spring 180 engaging one of the bearings 177' for the rod and a pin 180' on the rod. Upon each rod is mounted a cam roller carrying arm 179 having a roller 181 (Fig. 16) adapted to enter into a cam groove 182 in the cam slot carrying member of the drum. The action of these cams and rollers moves the rollers 178 down into position to engage the can ends as they are fed into the turret. The can ends are positioned by the rollers 178 in alignment with the cut gaskets and when the turret has rotated through an arc of 180° the gasket and end are assembled. This is accomplished by an upward movement of the movable member 86 of the composite cutting die upon which the liner has been resting from the time of its formation until this point in the operation.

A yoke lever 183 (Fig. 7) embraces the member 86 and is pivoted at 184 upon the collar 76 already described and is pivoted also at 185 to the member 86. Each lever 183 carriers at its outer end a roller 186 adapted to enter in to a fixed lifting cam 187 extending down from the underside of the bed and adapted to move the lever from the position shown at the left in Fig. 9 to that shown at the right. This action effects the assembling of the end and gasket.

In order that the roller 178 may continuously engage the can end until the time for its discharge an arcuate slot 188 is provided in the top plate 36 and after the can end has received the gasket this roller continues on around until the can end engages a curved end 189 of the slot 176 in which it has been moving (as indicated in dotted lines in Figs. 14 and 15). The roller pushes it aside and is then drawn up by the spring 180 to above the level of the cover plate. The gasket lined end then remains stationary until the next lined end is brought against it when it is pushed ahead and drops into a stack holder 190 beneath the opening indicated in dotted lines at 191. After the turret has rotated another 90° from the assembling station the core is ejected by a downward movement of the core knock-out punch 108, this movement being accomplished by an engagement of its cam groove 143 which causes it to move down as indicated in Fig. 18, an aperture 192 (Figs. 14 and 15) being provided through the cover plate 36 to permit this action to occur.

As the cores are delivered through the members 86 they fall into a hopper 193 having inclined sides, this hopper extending completely beneath the path of the members 86 in order to receive any cores that may be dropped either before or after the action of the knock-out punches, these cores being merely held frictionally until the action of the knock-out punch and being light may fail to fall accurately when pushed from the smaller part of the member 86.

A complete cycle of operation and the timing of the various cams and associated mechanisms is indicated in Figs. 22 to 25 inclusive, in which the degree of angular movement of the turret and time occupied by the various steps is indicated but it is believed need not be described herein. It may be pointed out, however, that as indicated in Fig. 23 and in Fig. 26 the period of cutting, indicated at C, is approximately 4°.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a machine for cutting gasket liners and assembling them with can ends, the combination of a pair of horizontally mounted, continuously rotating turrets, means for moving a web or strip of gasket material continuously past said turrets in a straight line, each of said turrets carrying a plurality of cutting elements operating in directions parallel with the axes of the turrets and so mounted that each cutting element of a turret cuts alternate gaskets from said web at the point of intersection of the travel of said turret and web, the cutting elements on the two turrets being timed to operate on the web simultaneously.

2. In a machine for cutting gasket liners and assembling them with can ends, the combination of a pair of horizontally mounted, continuously rotating turrets, means for moving a web or strip of gasket material continuously past said turrets, each of said turrets carrying a plurality of cutting elements so mounted that each cutting element on a turret cuts alternate gaskets from said web, the cutting elements on the two turrets being timed to operate on the web simultaneously, and cooperating mechanism which feeds said can ends to receive said cut gaskets.

3. In a machine for cutting gasket liners and assembling them with can ends, the combination of a pair of horizontally rotatable turrets, means for moving gasket material continually past said turrets, and a plurality of cutting elements mounted on each turret and operating in directions parallel with the axes of the turrets, the cutting elements of the two turrents being timed to operate upon the gasket material simultaneously and the means for moving the gasket material being timed to cause the cutting elements of the second turret to operate between the cuts made by the cutting elements of the front turret.

4. In a machine for cutting gasket liners to be assembled with can ends, the combination of a horizontally mounted continuously rotating turret, means for moving a web or strip of gasket material continuously and cutting elements mounted on the turret and movable crosswise of the plane of rotation for cutting said gasket liners from said web of material during the movement of said turret and said web.

5. In a machine for cutting gasket liners to be assembled with can ends, the combination of a continuously rotating turret, means for moving a web or strip of gasket material continuously in a straight line past the turret, and cutting elements mounted on the turret and movable crosswise of the plane of rotation for cutting gasket liners from said web at the intersection of the travel of said web and turret.

6. In a machine for cutting gasket liners and assembling them with can ends, the combination of means for feeding a strip or web of gasket material continuously and cutting and applying elements having a continuous advancing movement in a plane parallel with the plane of said material and adapted to operate upon said strip at different points in the travel of said strip, said cutting elements cutting and applying gaskets from said strip.

7. In a machine for cutting gasket liners and assembling them with can ends, the combination of means for feeding a strip or web of gasket material continuously and cutting elements having a continuous advancing movement in a plane parallel with the plane of said material and adapted to operate upon said strip at different points in the travel of said strip, and together cutting simultaneously a plurality of gaskets from said strip.

8. In a machine for cutting gasket liners to be applied to can ends, the combination of means for feeding a strip or web of gasket material continuously, a plurality of cutting elements, and means for actuating said cutting elements with a continuous advancing movement in a plane parallel with the plane of said material, and means for reciprocating said cutting elements towards and from said material to cut gasket liners from said strip while it is moving.

9. In a machine for cutting gasket liners to be applied to can ends, the combination of means for feeding a strip or web of gasket material along an individual path of travel with a continuous movement, cutting elements also movable along an individual path of travel with a continuous advancing movement in a plane parallel with the plane of said material, and means for actuating said cutting elements to cut a gasket liner from said strip while said strip and said cutting elements are in motion.

10. In a can end lining machine, the combination of mechanism for feeding a paper web of gasket material in a defined longitudinal path, a first gasket cutting and gasket and can end assembling mechanism arranged adjacent said path of the material for cutting gaskets from said material at spaced intervals and assembling them with can ends, a second gasket cutting and gasket and can end assembling mechanism arranged adjacent the path of said material and adapted to cut gaskets therefrom in the spaces left by said first cutting mechanism and to assemble said gaskets with can ends, means for feeding can ends to said first and second mechanisms, and power devices for actuating said feeding mechanism and said first and second mechanisms in timed relation.

11. In a can end lining machine, the combination of mechanism for feeding a paper web of gasket material in a defined longitudinal path, a first gasket cutting and gasket and can end assembling mechanism arranged adjacent said path of the material for cutting gaskets from said material at spaced intervals and assembling them with can ends, a second gasket cutting and gasket and can end assembling mechanism arranged adjacent the path of said material and adapted to cut gaskets therefrom in the spaces left by said first cutting mechanism and to assemble said gaskets with can ends, means for feeding can ends to said first and second mechanisms, and power devices for actuating said feeding mechanism and advancing said first and second mechanisms continuously in timed relation.

12. In a can end lining machine, the combination of mechanism for feeding a paper web of gasket material in a defined longitudinal path, a first gasket cutting and gasket and can end assembling mechanism arranged adjacent said path of the material, having cutters reciprocating towards and from the plane of said material, for cutting gaskets from said material at spaced intervals and assembling them with can ends, a second gasket cutting and gasket and can end assembling mechanism arranged adjacent the path of said material, having cutters reciprocating towards and from the plane of said material, and adapted to cut gaskets therefrom in the spaces left by said first cutting mechanism and to assemble said gaskets with can ends, means for feeding can ends to said first and second mechanisms, and power devices for actuating said feeding mechanism and advancing said first and second mechanisms continuously in timed relation.

13. In a can end lining machine, the combination of mechanism for feeding a paper web of gasket material in a defined longitudinal path, a first gasket cutting and gasket and can end assembling mechanism arranged adjacent said path of the material for cutting gaskets from said material at spaced intervals and assembling them with can ends, a second gasket cutting and gasket and can end assembling mechanism arranged adjacent the path of said material and adapted to cut gaskets therefrom in the spaces left by said first cutting mechanism and to assemble said gaskets with can ends, means for feeding can ends to said first and second mechanisms, and power devices for actuating said feeding mechanism and advancing said first and second mechanisms continuously in timed relation, said cutting mechanisms having cutters reciprocable towards and from the plane of the material and means for moving the cutters across the path of the material.

14. In a can end lining machine, the combination of mechanism for feeding a paper web of gasket material in a defined longitudinal path, a first gasket cutting and gasket and can end assembling mechanism arranged adjacent said path of the material for cutting gaskets from said material at spaced intervals and assembling them with can ends, a second gasket cutting and gasket and can end assembling mechanism arranged adjacent the path of said material and adapted to cut gaskets therefrom in the spaces left by said first cutting mechanism and to assemble said gaskets with can ends, means for feeding can ends to said first and second mechanisms, and power devices for actuating said feeding mechanism and advancing said first and second mechanisms continuously in timed relation, said cutting mechanisms having cutters reciprocable towards and from the plane of the material and movable parallel with the said plane and with the material during their reciprocation.

15. In a can end lining machine, the combination of mechanism for feeding a paper web of gasket material in a defined longitudinal path, a gasket cutting and gasket and can end assembling mechanism arranged adjacent said path of the material for cutting gaskets from said material and assembling them with can ends, means for feeding can ends to said cutting and assembling mechanism, and power devices for actuating said feeding mechanism and advancing said cutting and assembling mechanism with a continuous movement in timed relation, said cutting mechanism having cutters reciprocable towards and from the plane of the material and movable parallel with the said plane and with the material during their reciprocation.

16. In a can end lining machine, the combination of mechanism for feeding a paper web of gasket material in a defined longitudinal path, a first gasket cutting and gasket and can end assembling mechanism comprising a rotatable turret arranged adjacent said path of the material for cutting gaskets from said material at spaced intervals at a cutting station and assembling them with can ends, a second gasket cutting and gasket and can end assembling mechanism comprising a rotatable turret arranged adjacent the path of said material and adapted to cut gaskets therefrom in the spaces left by said first cutting mechanism at a second cutting station and to assemble said gaskets with can ends, means for feeding can ends to said first and second mechanisms, and power devices for actuating with a continuous movement said feeding mechanism and advancing said first and second mechanisms in timed relation.

17. In a can end lining machine, the combination of mechanism for feeding a paper web of gasket material in a defined longitudinal path, a first gasket cutting and gasket and can end assembling mechanism comprising a rotatable turret arranged adjacent said path of the material and having a cutting station for cutting gaskets from said material at spaced intervals and assembling them with can ends, a second gasket cutting and gasket and can end assembling mechanism comprising a rotatable turret arranged adjacent the path of said material and adapted to cut gaskets therefrom at a second cutting station in the spaces left by said first cutting mechanism and to assemble said gaskets with can ends, means for feeding can ends to said first and second mechanisms, and power devices for actuating said feeding mechanism and said first and second mechanisms in timed relation.

18. In a cutting mechanism for ring liner machines, the combination of means for feeding gasket material in a defined path, a cutting mechanism adjacent said path and having cutters reciprocable towards the plane of the material, and power mechanism for actuating said feeding means continuously and for advancing said cutting mechanism continuously in a plane parallel with the plane of the material and for reciprocating said cutters during their said movement.

19. The combination of mechanism for feeding a paper web of gasket material in a defined longitudinal path, a first gasket cutting mechanism arranged adjacent said path of the material for cutting gaskets from said material at spaced intervals, a second gasket cutting mechanism arranged adjacent the path of said material and adapted to cut gaskets therefrom in the spaces left by said first cutting mechanism, and power devices for actuating said feeding mechanism and advancing said first and second cutting mechanisms continuously in timed relation, said cutting mechanisms having cutters reciprocable towards and from the plane of the material and movable parallel with the said plane and with the material during their reciprocation.

20. In a can end lining machine, the combination of mechanism for feeding a paper web of gasket material in a defined longitudinal path, a first gasket cutting mechanism comprising a rotatable turret arranged adjacent said path of the material and having cutters reciprocable parallel with the axis of the turret for cutting gaskets from said material at spaced intervals at a cutting station, a second gasket cutting mechanism comprising a rotatable turret arranged adjacent the path of said material and having cutters reciprocable parallel with the axis of the turret and adapted to cut gaskets from said material in the spaces left by said first cutting mechanism and at a second station, and power devices for actuating with a continuous movement said feeding mechanism and said turrets in timed relation.

21. In a can end lining machine, the combination of mechanism for feeding a paper web of gasket material in a defined longitudinal path, a first gasket cutting mechanism comprising a rotatable turret arranged adjacent said path of the material for cutting gaskets from said material at spaced intervals at a cutting station, a second gasket cutting mechanism comprising a rotatable turret arranged adjacent the path of said material and adapted to cut gaskets therefrom in the spaces left by said first cutting mechanism at a second cutting station, power devices for actuating said feeding mechanism and said first and second mechanism in timed relation, and cooperating mechanism which feeds said can ends to receive said cut gaskets.

22. In a machine for cutting gasket liners to be applied to flanged can ends, the combination of means for moving a web or strip of gasket material, cutting elements having bodily as well as cutting movements, the said cutting elements in their bodily movement intersecting the path of movement of the gasket material at a plurality of cutting stations, and means for actuating the cutting elements for cutting gaskets at such intersections of the paths of movements of the cutting elements and the gasket material.

23. In a machine for cutting gasket liners to be applied to flanged can ends, the combination of means for moving a strip or web of gasket material, cutting elements and means for continuously moving said cutting elements bodily to intersect the movement of the strip at a plurality of cutting stations in the travel of the strip, and means for actuating said cutting elements at such intersections.

24. In a machine for cutting gasket liners to be applied to flanged can ends, the combination of means for moving a strip or web of gasket material, and a plurality of sets of cutting elements arranged and operating at separate cutting stations for cutting gasket from said web, said sets cutting upon alternate portions of said web, said material moving means acting to feed to one of said sets of cutting elements the portions of the material which is left between cuts made by the other of said sets of cutting elements, and cooperating mechanism which feeds said can ends to receive said cut gaskets.

25. In a machine for cutting gasket liners to be applied to flanged can ends, the combination of means for moving a strip or web of gasket material, and a plurality of simultaneously acting sets of cutting elements for cutting gaskets from said web, said sets being independently movable one relative to another in parallel planes and in paths intersecting the path of said strips or web and cutting upon alternate portions of said web.

26. In a machine for cutting gasket liners to be applied to flanged can ends, the combination of means for feeding a strip or web of gasket material continuously in a straight line, reciprocating punches having a continuous circular movement in a plane substantially parallel to the plane of said material, said path bringing said punches over the gasket material, and means for actuating said punches to cut a gasket from said strip while said strip and punch are moving.

27. In a machine for cutting gasket liners to be applied to flanged can ends, the combination of means for feeding a strip or web of gasket material continuously in a straight line, cutting punches having a continuous circular movement in a plane substantially parallel to the plane of said material, said path bringing said cutting punches over the gasket material, and means for actuating said punches transversely to the plane of said strip to cut a gasket from said strip within a relatively small arc of movement of the cutting elements.

28. In a machine for cutting gasket liners to be applied to flanged can ends, the combination of means for moving a strip or web of gasket material, cutting instrumentalities for cutting gasket liners and cores from said strip or web, said cutting instrumentalities acting to convey said gasket and core to separate delivery stations, and power mechanism actuating the strip moving means and conveying said cutting instrumentalities and cut gaskets with a continuous movement.

29. In a machine for cutting and applying gasket liners to flanged can ends, the combination of means for feeding a strip or web of gasket material, cutting instrumentalities for cutting a gasket and a core from said material and acting to retain said core and gasket after being cut and movable thereafter to receive a can end in axial alinement with said gasket, means for positioning the gasket on said can end and the core in a stack, and power mechanism actuating the strip-moving means and conveying said cutting instrumentalities, cut gaskets and can ends with a continuous movement.

30. In a machine for cutting gasket liners to be applied to flanged can ends, the combination of means for feeding a strip or web of gasket material, cutting instrumentalities for cutting a core and a gasket from said material, one member of said instrumentalities serving to retain the core and liner for subsequent disposition, and mechanism giving a continuous movement to said feeding means, cutting instrumentalities and gasket.

31. In a machine for cutting gasket liners to be applied to flanged can ends, the combination of means for feeding a strip or web of gasket material, cutting instrumentalities for cutting a core and a gasket from said material, one member of said instrumentalities serving to retain and convey the core and liner for subsequent disposition, and mechanism giving a continuous movement to said feeding means, cutting instrumentalities and gasket.

32. In a machine for cutting gasket liners to be applied to flanged can ends, the combination of means for continuously feeding a strip or web of gasket material, and cutting instrumentalities for cutting a core and a gasket from said material during movement of the strip, said cutting instrumentalities serving to retain both a core and gasket for subsequent disposition.

33. In a machine for cutting gasket liners to be applied to flanged can ends, the combination of means for continuously feeding a strip or web of gasket material, and cutting instrumentalities for cutting a core and a gasket from said material during movement of the strip, one member of said cutting instrumentalities serving to retain both a core and a gasket for subsequent disposition.

34. In a machine for cutting gasket liners to be applied to flanged can ends, the combination of means for feeding a strip or web of gasket material continuously, bodily moving cutting instrumentalities for cutting a core and a gasket from said material, said instrumentalities retaining both the core and gasket for subsequent disposition.

35. In a machine for cutting gasket liners to be applied to flanged can ends, the combination of means for feeding a strip or web of gasket material continuously, bodily moving cutting instrumentalities for cutting a core and a gasket from said material, one member of said cutting instrumentalities retaining both the core and gasket for subsequent disposition.

36. In a machine for cutting gasket liners to be applied to flanged can ends, the combination of a plurality of spaced sets of cutting instrumentalities and means for moving a strip or web of gasket material successively past said cutting instrumentalities, said cutting instrumentalities being spaced to cut alternate portions of said strip, and means for moving certain of said cutting instrumentalities in planes parallel with said strip during the cutting operation.

37. In a machine for cutting gasket liners to be applied to flanged can ends, the combination of means for continuously feeding a strip or web of gasket material along a straight path, a continuously rotatable turret and cutting elements carried by the turret and disposed on opposite sides of said strip for cutting gaskets therefrom.

38. In a machine for cutting gasket liners to be applied to flanged can ends, the combination of means for feeding a strip or web of gasket material along a straight path, a continuously rotatable turret and cutting elements carried by the turret and disposed on opposite sides of said strip for cutting gaskets therefrom.

39. In a machine for cutting gasket liners to be applied to flanged can ends, the combination of means for continuously feeding a strip or web of gasket material, continuously moving cutting instrumentalities having orbital paths in planes parallel with said web, and means for bringing said cutting instrumentalities into intermittent engagement with the strip to cut liners therefrom.

40. In a machine for cutting and applying gasket liners to flanged can ends, the combination of means for continuously feeding a strip or web of gasket material, and cutting instrumentalities for cutting gaskets from said strip parts of said cutting instrumentalities applying them to the can ends.

41. In a machine for cutting and applying gasket liners to flanged can ends, the combination of means for feeding a strip or web of gasket material, a continuously bodily movable cutting element, means co-operating therewith for cutting a gasket from said strip and placing it in said cutting element, means for aligning a can end with said cutting element, and means for depositing the gasket in said can end from said cutting element.

42. In a machine for cutting and applying gasket liners to flanged can ends, the combination of means for feeding a strip or web of gasket material, a continuously bodily movable cutting element, means co-operating therewith for cutting a gasket from said strip and placing it in said cutting element, means for temporarily aligning a can end with said cutting element, and means for depositing the gasket in said can end from said cutting element.

43. In a machine for cutting and applying gasket liners to flanged can ends, the combination of means for feeding a strip or web of gasket material, a continuously moving cutting element, means co-operating therewith for cutting a liner from said strip, means movable with said cutting element for receiving a can end in axial alignment with the cut gasket and conveying it throughout a predetermined portion of the travel of said cutting element, and means operable during said portion of travel for assembling the liner with said can end.

44. In a machine for cutting gasket liners to be assembled on the flanges of can ends, the combination of means for advancing gasket liner material continuously in a straight line, and rotatable cutting devices which are advanced in planes parallel with the face of said material, and intersect in their path of movement the path of said material, and means for actuating said cutting devices to cut liners from said material, the cutting action of said cutting devices occurring within a relatively small arc of travel.

45. In a machine for cutting gasket liners to be assembled on the flanges of can ends, the combination of means for advancing gasket liner material continuously in a straight line, and rotatable cutting devices having orbital movement in a plane parallel with the face of said material and intersecting in their path of movement the path of said material, the path of movement of said cutting devices and the path of movement of said strip being sufficiently nearly coincident throughout the period of cutting operation to permit of the formation of a substantially accurate gasket.

46. In a machine for cutting gasket liners to be assembled on the flanges of can ends, the combination of means for advancing gasket liner material continuously in a straight line, and rotatable cutting devices having orbital movement in a plane parallel with the face of said material and intersecting in their path of movement the path of said material, the radius of movement of said cutting devices and the speed of movement of said gasket material and cutting devices bearing a relation to each other to permit of the cutting of a substantially accurate gasket during the movements of said material and said cutting devices.

47. A method of cutting and applying thin, flat, flexible gaskets for can ends, which comprises the following related steps: moving the gasket material continuously past a fixed point, cutting the gaskets therefrom while said strip is moving, and retaining mechanical control of said gaskets by the devices used for cutting them and applying said gaskets directly into the can ends.

48. A method of cutting and applying gasket liners for can ends from thin, flexible material, which comprises the following related steps: continuously advancing a strip or web of gasket material past a plurality of gasket cutting devices, moving said gasket cutting devices continuously in circular paths intersecting the straight line path of the gasket material, actuating the gasket cutting devices to engage said strip of gasket material at the intersection of said paths, carrying the gasket liners formed in the cutting actions to an assembling location and assembling with can ends.

49. A method of cutting and handling gasket liners for can ends from thin, flat, flexible material, which comprises the following related steps: advancing a strip or web of gasket material in a straight path and with a continuous movement adjacent a plurality of gasket cutting devices and actuating such gasket cutting devices in a direction at right angles to said strip and also advancing said cutting devices with said strip about an axis at right angles to said strip to cut alternate gaskets from alternate portions of said strip.

50. A method of cutting and handling gasket liners for can ends from thin, flat, flexible material, which comprises the following related steps: advancing a strip or web of gasket material in a straight path and with a continuous movement adjacent a plurality of gasket cutting devices and actuating such cutting devices in a direction at right angles to said strip and also advancing said cutting devices with said strip about an axis at right angles to said strip simultaneously to cut alternate gaskets from alternate portions of said strip.

Signed in the presence of two subscribing witnesses.

CHARLES W. GRAHAM.

Witnesses:
D. F. MENNIS,
WARREN L. BALD.